Nov. 28, 1961  B. SILVER  3,011,005
THERMOCOUPLE
Filed Aug. 21, 1959  2 Sheets-Sheet 1
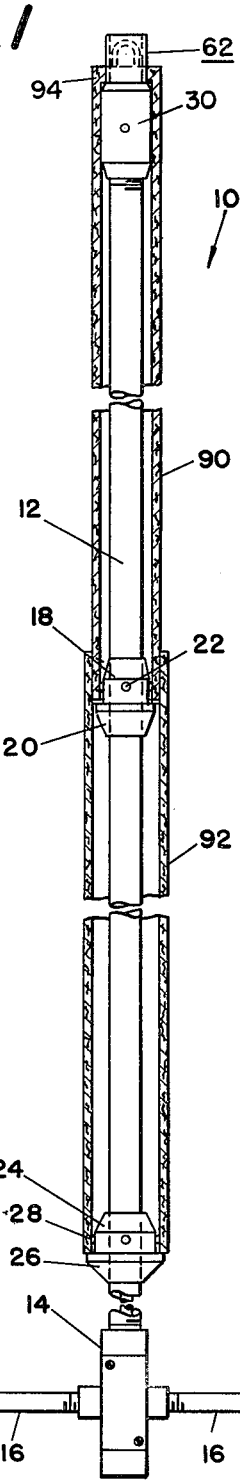
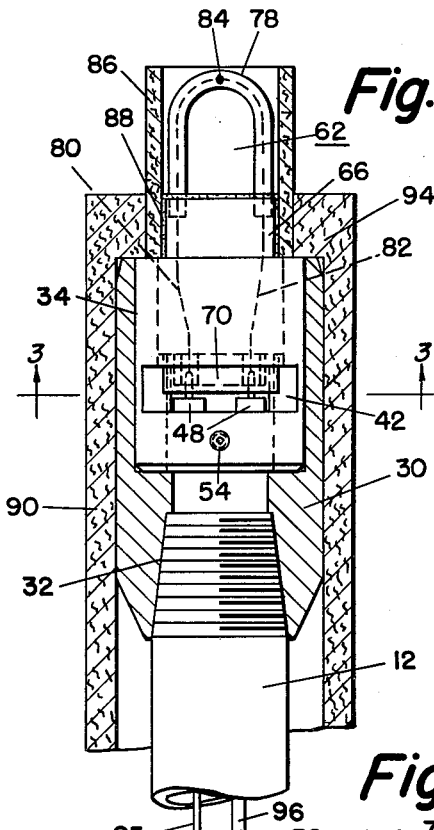
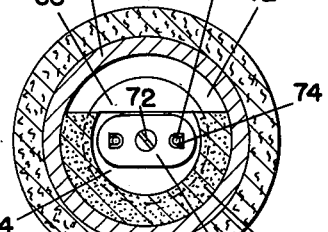
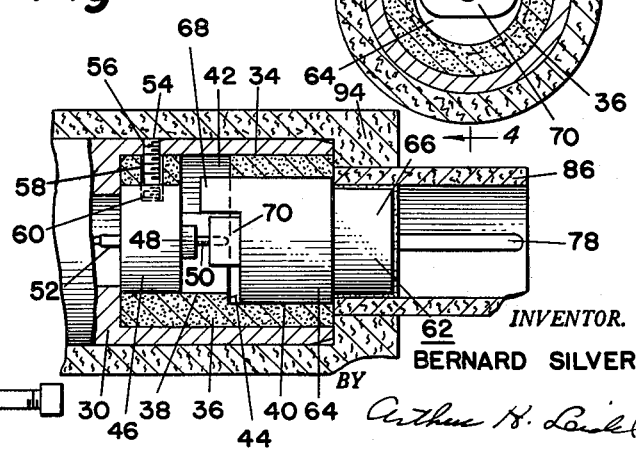
INVENTOR.
BERNARD SILVER
BY Arthur H. Leichl
ATTORNEY Nov. 28, 1961 B. SILVER 3,011,005
THERMOCOUPLE
Filed Aug. 21, 1959 2 Sheets-Sheet 2
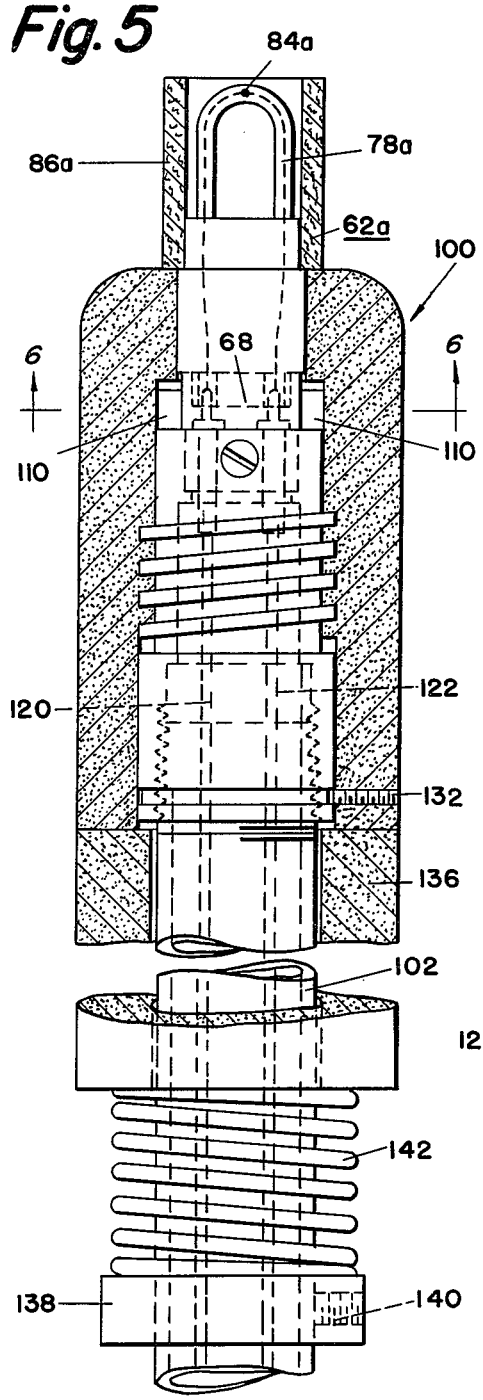
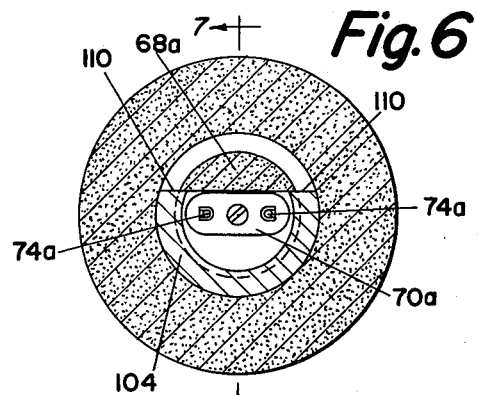
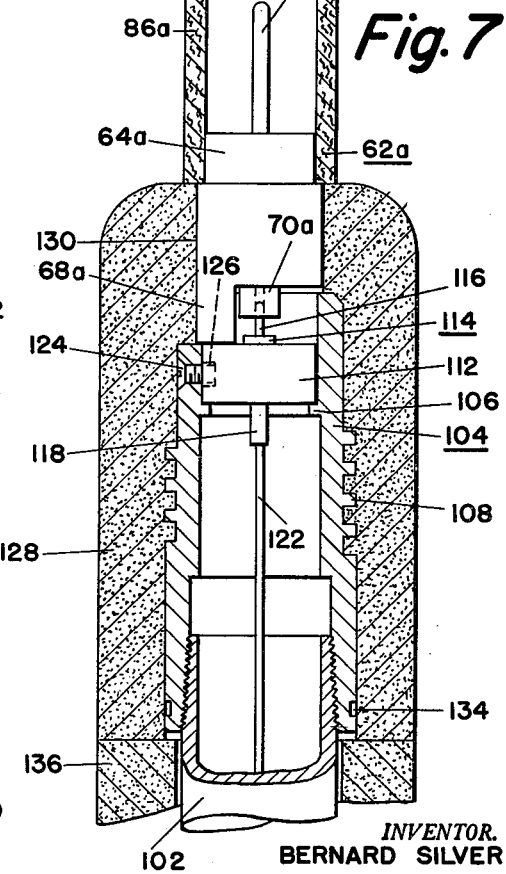
INVENTOR.
BERNARD SILVER
BY
Arthur H. Seidel
ATTORNEY

United States Patent Office 3,011,005
Patented Nov. 28, 1961

3,011,005
THERMOCOUPLE
Bernard Silver, North Hills, Pa., assignor to Electro-Nite Engineering Company, Philadelphia, Pa., a corporation of Pennsylvania
Filed Aug. 21, 1959, Ser. No. 835,269
18 Claims. (Cl. 136—4)

The present invention relates to a thermocouple, and more particularly to an expendable, immersion-type thermocouple.

In the manufacture of steel, it is necessary to measure the temperature of the molten bath within the open hearth or electric furnace. The most accurate method for measuring the temperature of the molten bath is by means of a thermocouple which is connected to a recording device. Since the thermocouple must be immersed in the molten metal bath, the thermocouple must be mounted on an elongated holder by which the thermocouple can be inserted into the furnace. In order to protect the wires extending through the holder from the thermocouple from being adversely affected by the heat of the molten metal bath, it is necessary to protect the holder from the heat of the bath. Also, since the thermocouple is immersed directly into the molten metal bath, the thermocouple has only a relatively short period of life. Therefore, the thermocouple must be expendable, and must be easily removable from the holder to permit a new thermocouple to be mounted on the holder.

It is an object of the present invention to provide a novel thermocouple.

It is another object of the present invention to provide a novel expendable immersion-type thermocouple.

It is still another object of the present invention to provide an immersion-type thermocouple in which the wires from the thermocouple are protected from excess heat.

It is a further object of the present invention to provide an expendable immersion-type thermocouple in which the thermocouple unit is easily and quickly replaceable.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is an elevational view, partially sectioned, of a thermocouple of the present invention.

FIGURE 2 is a sectional view, partially in elevation, of the end of the thermocouple shown in FIGURE 1.

FIGURE 3 is a sectional view taken along line 3—3 of FIGURE 2.

FIGURE 4 is a sectional view taken along the line 4—4 of FIGURE 3.

FIGURE 5 is an elevational view, partially in section, of a modification of the thermocouple of the present invention.

FIGURE 6 is a sectional view taken along line 6—6 of FIGURE 5.

FIGURE 7 is a sectional view taken along line 7—7 of FIGURE 6.

Referring initially to FIGURE 1, the thermocouple of the present invention is generally designated as 10.

Thermocouple 10 comprises an elongated iron pipe 12 having a junction box 14 for electrical wires secured to the back end of the pipe 12. Handle 16 are secured to the junction box 14, and are perpendicular to the pipe 12.

A collar 18 is disposed around the pipe 12 spaced from the front end of the pipe 12. Collar 18 has an annular flange 20 extending radially from the back end of the collar 18. The back surface of the flange 20 is tapered inwardly. Collar 18 is provided with a plurality of headed setscrews 22 which are threaded through the collar 18 to engage the pipe 12 and thereby secure the collar 18 in position on the pipe 12. The front end of the collar 18 is tapered inwardly. A collar 24 is disposed around the pipe 12 spaced back of the collar 18. Collar 24 has an annular flange 26 extending radially from the back end of the collar 24. The back surface of the flange 20 is tapered inwardly. Collar 24 is provided with a plurality of headed setscrews 28 which are threaded through the collar 24 to engage the pipe 12, and thereby secure the collar 24 in position on the pipe 12. The front end of the collar 24 is tapered inwardly. The outer diameter of the collar 24 is slightly larger than the diameter of the flange 20 of the collar 18.

A metal sleeve 30 is secured to the front end of the pipe 12. Sleeve 30 has a threaded, tapered counterbore 32 in its back end which is threaded onto the front end of the pipe 12, and a cylindrical counterbore 34 in its front end. A sleeve 36 of graphite is disposed within the cylindrical counterbore 34 of the sleeve 30. The graphite sleeve 36 has a bore 38, and a counterbore 40 in the front end of the sleeve 36. Graphite sleeve 36 has a transverse slot 42 extending slightly less than halfway across the sleeve 36. The front end of the slot 42 is in direct alignment with the shoulder 44 between the bore 38 and the counterbore 40 of the sleeve 36.

A ceramic disc 46 is disposed within the back end of the bore 38 of the sleeve 36. A pair of terminals 48 extend through the disc 46. Each of the terminals 48 has a male prong 50 projecting forwardly from the disc 46, and a socket 52 extending rearwardly from the disc 46 and adapted to receive a wire. A setscrew 54 is threaded through a hole 56 in the metal sleeve 30. Setscrew 54 extends through a hole 58 in the graphite sleeve 36 and projects in a recess 60 in the disc 46 to secure the graphite sleeve 36 and the disc 46 within the metal sleeve 30.

A replaceable thermocouple unit, generally designated as 62, is secured in the front end of the graphite sleeve 36. Thermocouple unit 62 comprises a cylindrical graphite or ceramic body 64 of a diameter equal to the diameter of the counterbore 40 of the graphite sleeve 36. The body 64 has a reduced diameter front end portion 66, and the back end of the body 64 is cut away transversely across the body 64 to provide the rearwardly extending segment 68. A ceramic terminal block 70 is secured to the back end of the body 64 beneath the segment 68 by a screw 72. Terminal block 70 has a pair of sockets 74 therein, and a female contact member 76 in each of the sockets 74. The sockets 74 are adapted to receive the male prongs 50 extending from the disc 46. A U-shaped quartz tube 78 is secured to the front end of the body 64 with the ends of the tube 78 being secured within holes in the front end of the body 64. The thermocouple wires 80 and 82 are connected to the contacts 76, and extend longitudinally through the body 64 and through opposite legs of the U-shaped tube 78. The thermocouple wires 80 and 82 are joined together at the junction 84 which is in the base of the U-shaped tube 78. The thermocouple wires 80 and 82 may be of any well known materials used for thermocouples, such as platinum and rhodium, or tungsten and molybdenum. A protective sleeve 86 of a fiberboard material is disposed around the U-shaped tube 78 and the front end portion 66 of the body 64. The sleeve 86 is secured to the front end portion 66 of the body 64 by a layer of cement 88. The cement 88 also extends across the front end of the front end portion 66 to secure the U-shaped tube 78 to the body 64.

A pair of heavy fiberboard tubes 90 and 92 are disposed around the pipe 12. Tube 90 has an annular flange 94 extending radially inwardly at the front end of the tube 90. The tube 90 fits around the metal sleeve 30 and the front end of the pipe 12 with the flange 94 engaging the front end of the sleeve 30, and the protective sleeve 86 of the replaceable thermocouple unit 62 extending through the flange 94. The collar 18 fits into the back end of the tube 90 with the flange 20 of the collar 18 engaging the back end of the tube 90. The heads of the setscrews 22 bite into the inner surface of the tube 90 to frictionally secure the tube 90 to the collar 18. The outer diameter of the tube 90 is slightly greater than the outer diameter of the flange 20 of the collar 18. The tube 92 extends around the back end of the pipe 12. The internal diameter of the tube 92 is substantially equal to the external diameter of the tube 90. The front end of the tube 92 extends around and frictionally engages the back end of the tube 90. The collar 24 fits into the back end of the tube 92 with the flange 26 of the collar 24 engaging the back end of the tube 92. The heads of the setscrews 28 bite into the inner surface of the tube 92 to frictionally hold the tube 92 to the collar 24. The outer diameter of the tube 92 is slightly greater than the outer diameter of the flange 26 of the collar 24.

The thermocouple 10 of the present invention is used as follows:

The replaceable thermocouple unit 62 is attached to the thermocouple 10 by inserting the body 64 into the counterbore 40 of the graphite sleeve 36 until the male prongs 50 are inserted in the sockets 74 of the terminal block 70. Since the body 64 is of a diameter equal to the diameter of the counterbore 40 of the graphite sleeve 36, the body 64 cannot be inserted into the graphite sleeve 36 beyond the shoulder 44. However, the transverse slot 42 provides an opening which is of the same size and shape as the rearwardly extending segment 68 of the body 64. Therefore, in order to insert the body 64 deep enough into the graphite sleeve 36 to permit the sockets 74 of the terminal block 70 to receive the male prongs 50, the segment 68 of the body 64 must be inserted into the opening provided by the transverse slot 42. Thus, there is provided a one-position connection between the replaceable thermocouple unit 62 and the graphite sleeve 36 so that each of the male prongs 50 will always be inserted in the same socket 74 of the terminal block 70 of the thermocouple unit 62. When the replaceable thermocouple unit 62 is operatively connected to the thermocouple 10, the tubes 90 and 92 can be placed around and properly positioned on the pipe 12.

The wires 95 and 96 which are connected to the sockets 52 of the terminals 48, and which extend through the pipe 12 to the junction box 14, are connected to a temperature recording device, not shown. The thermocouple 10 can then be inserted into a furnace by means of the handle 16, and the front end of the thermocouple 10 immersed into the molten metal bath. The tubes 90 and 92 protect the pipe 12, sleeve 36, collars 18 and 24, and the wires 95 and 96 from being adversely affected by the heat of the molten metal bath. The protective sleeve 86 around the U-shaped tube 78 provides protection for the U-shaped tube 78 and thermocouple wires 80 and 82 during the handling of the thermocouple unit 62 but is quickly destroyed by the heat of the molten metal bath to permit a temperature reading to be obtained. Although the tubes 90 and 92 may be damaged by the heat of the molten metal bath, the tubes 90 and 92 are relatively inexpensive and can be easily and quickly replaced. Also, the thermocouple unit 62 can be easily and quickly replaced when it becomes damaged by the molten metal bath.

When the front end of the thermocouple 10 is immersed in the molten metal bath, some of the molten metal may flow between the protective sleeve 86 of the replaceable thermocouple unit 62, and the inner periphery of the flange 94 on the tube 90. However, such molten metal will come into contact with the end of the graphite sleeve 36. The graphite sleeve 36 causes the molten metal to freeze, and thereby seal the space between the protective sleeve 86 and the flange 94 of the tube 90 against any further flow of molten metal. However, the metal will not stick to the graphite sleeve 36 so that the tube 90 and the replaceable thermocouple unit 62 can be easily removed from the thermocouple 10 when they become damaged.

The tubes 90 and 92 can be easily removed from the pipe 12 by pulling the pipe 12 from the furnace with the edge of the opening through the furnace door sliding against the pipe 12. When the edge of the opening engages the flange 26 of the collar 24, the tapered back surface of the flange 26 will cam the edge of the opening against the end of the tube 92. As the pipe 12 is further pulled from the furnace, the edge of the opening will prevent movement of the tube 92 so that the pipe 12 will be pulled out of the tube 92. Likewise when the edge of the opening engages the flange 20 of the collar 18, the edge of the opening will be cammed against the end of the tube 90. Further pulling of the pipe 12 from the furnace will pull the pipe 12 out of the tube 90 which is prevented from moving by the edge of the opening. Thus the tubes 90 and 92 can be easily removed from the thermocouple 10 as the thermocouple 10 is removed from the furnace.

The one-position connection between the replaceable thermocouple unit 62 and the thermocouple 10 permits ease of properly connecting the replaceable thermocouple unit 62 to the wires 95 and 96 since the one-position coupling aligns the sockets 74 of the terminal block 70 with the male prongs 50. In addition, the one-position coupling assures that the thermocouple wires 80 and 82 are each connected to its proper wire 95 or 96. In order to properly record the signal from the thermocouple 10, the thermocouple wires 80 and 82 must be properly connected to the terminals of the recording device. The one-position coupling assures that the thermocouple wire 80 will always be connected to the wire 95, and the thermocouple wire 82 will be coupled to the wire 96 so that the thermocouple wires 80 and 82 are always properly connected to the recording device. Also, when the thermocouple wires 80 and 82 are made of platinum and a platinum rhodium alloy respectively, the connecting wires 95 and 96 and its respective terminal 48 should be preferably made of a nickel-copper alloy and pure copper respectively. Thus, the platinum thermocouple wire should be connected to the nickel-copper alloy connecting wire, and the platinum-rhodium alloy thermocouple wire should be connected to the pure copper connecting wire. The one-position coupling of the thermocouple 10 of the present invention assures the proper connection between the thermocouple wires and the connecting wires.

Referring to FIGURE 5, a modification of the thermocouple of the present invention is generally designated as 100.

Thermocouple 100 comprises an elongated iron pipe 102 having a junction box and a handle, not shown, secured to the back end of the pipe 102. A metal sleeve 104 is threadably secured to the front end of the pipe 102. Sleeve 104 has an annular flange 106 extending radially inwardly from its inner surface at a point adjacent to but spaced from the front end of the sleeve 104. The sleeve 104 has a square thread 108 on its outer surface, which thread 108 extends along a portion of the sleeve 104 intermediate the ends of the sleeve 104. The front end of the sleeve 104 is cut away across slightly less than one-half of the diameter of the sleeve 104 to provide longitudinally extending shoulders 110.

A ceramic disc 112 is disposed within the front end of the sleeve 104, and is seated against the flange 106.

A pair of terminals 114 extend through and are electrically insulated from the disc 112. Each of the terminals 114 has a male prong 116 extending forwardly from the disc 112 and a socket 118 extending rearwardly from the disc 112. Wires 120 and 122 are secured in the terminal sockets 118 and extend through the pipe 102. A screw 124 is threaded through the front end of the sleeve 104, and extends into a recess 126 in the disc 112 to secure the disc 112 within the sleeve 104.

A plurality of graphite tubes 136 are provided around the pipe 102 to protect the pipe 102 and the wires 120 and 122 from the heat of the molten metal bath. A collar 138 is secured around the pipe 102 adjacent the back end of the pipe 102. A setscrew 140 is threaded through the collar 138 and engages the pipe 102 to secure the collar 138 to the pipe 102. A helical spring 142 is disposed around the pipe 102, and is compressed between the collar 138 and the back end of the backmost graphite tube 136. The spring 142 holds the graphite tubes 136 in engagement with each other and against the back end of the graphite sleeve 128.

The thermocouple 100 is provided with a replaceable thermocouple unit 62a which is identical to the replaceable thermocouple unit 62 shown in FIGURES 2 and 4. The graphite or ceramic body 64a of the thermocouple unit 62a is of a diameter equal to the diameter of the bore 130 of the graphite sleeve 128. The back end of the body 64a is cut away to provide the rearwardly extending segment 68a, and a ceramic terminal block 70a is secured to the back end of the body 64a beneath the segment 68a. The terminal block 70a has the sockets 74a which are adapted to receive the male prongs 116. A U-shaped quartz tube 78a, which contains the thermocouple wires, is secured to the front end of the body 64a, and a fiberboard protective sleeve 86a is secured around the front end of the body 64a.

To operatively secure the replaceable thermocouple unit 62a to the thermocouple 100, the body 64a is inserted in the bore 130 of the carbon sleeve 128. Since the body 64a is larger in diameter than the bore of the front end of the metal sleeve 104, the body 64a cannot enter the metal sleeve 104. However, the rearwardly extending segment 68a of the body 64a is adapted to fit within the opening between the shoulders 110 of the metal sleeve 104 and the bore of the graphite sleeve 128. When the segment 68a of the body 64a is inserted over the shoulders 110 of the metal sleeve 104, the sockets 74a of the terminal block 70a are in alignment with and are adapted to receive the male prongs 114 to electrically connect the thermocouple wires of the thermocouple unit 62a to the connecting wires 120 and 122. Thus, there is provided a one-position coupling between the thermocouple unit 62a and the thermocouple 100.

The thermocouple 100 of the present invention is used in the same manner as the thermocouple 10. However, the graphite sleeve 128 and the graphite tubes 136 not only protect the thermocouple 100 from the heat of the metal bath, but the graphite sleeve 128 and the graphite tubes 136 are not readily damaged by the molten metal bath. Thus, the thermocouple 100 can be reused many times without replacing the graphite sleeve 128 or the graphite tubes 136. Also, the replaceable thermocouple unit 62a can be easily and quickly replaced after each use of the thermocouple 100 without requiring the removal of the graphite sleeve 128 or the graphite tubes 136.

The present invention may be embodied in other specific forms without departing from the spirit or essential attributes thereof and, accordingly, reference should be made to the appended claims, rather than to the foregoing specification as indicating the scope of the invention.

I claim:

1. An immersion thermocouple comprising an elongated pipe, a coupler secured to the front end of said pipe, said coupler having a pair of juxtaposed longitudinally aligned bores extending from the front end of said coupler, the foremost of said bores being of a larger diameter than the rearmost of said bores, said rearmost bore having a portion of its wall adjacent the foremost bore tangentially removed to provide a pair of shoulders, a pair of male contact prongs supported in the rearmost bore of said coupler, and a replaceable thermocouple unit including a body member of a diameter equal to the diameter of the foremost bore of said coupler, a portion of the back end of said body being cut away to provide a rearwardly extending segment which is adapted to fit into the rearmost bore of said coupler over the shoulders, a pair of female contacts carried on the back end of said body beneath said segment, said female contacts being adapted to receive said male prongs of said coupler, a U-shaped tube having its ends secured to the front end of said body, and a pair of thermocouple wires extending through said body and said tube, one end of each of said wires being connected to a separate one of said female contacts and the other ends of said wires being joined together within said U-shaped tube.

2. An immersion thermocouple in accordance with claim 1 including a fiberboard tube disposed around the U-shaped tube and secured to the front end of the body.

3. An immersion thermocouple in accordance with claim 1 including protective tubes disposed around the pipe.

4. An immersion thermocouple in accordance with claim 3 in which the protective tubes are made of fiberboard.

5. An immersion thermocouple in accordance with claim 3 in which the protective tubes are made of graphite.

6. An immersion thermocouple comprising an elongated pipe, a metal sleeve secured to the front end of said pipe, a graphite sleeve disposed in the front end of said metal sleeve, said graphite sleeve having a pair of longitudinally aligned bores therethrough, the foremost of said bores being larger in diameter than the rearmost of said bores, said graphite sleeve having a transverse slot therethrough opening into said rearmost bore adjacent said foremost bore, said slot providing a pair of shoulders extending from said rearmost bore, a pair of male contact prongs supported in the rearmost bore of said carbon sleeve, and a replaceable thermocouple unit including a body member of a diameter equal to the diameter of the foremost bore of said carbon sleeve, a portion of the back end of said body being cut away to provide a rearwardly extending segment which is adapted to fit in the rearmost bore of said carbon sleeve over the shoulders, a pair of female contacts carried on the back end of said body beneath said segment, said female contacts being adapted to receive said male contact prongs, a U-shaped tube having its ends secured to the front of said body, and a pair of thermocouple wires extending through said body and said tube, one end of each of said wires being connected to a separate one of said female contacts and the other ends of said wires being joined together in said U-shaped tube.

7. An immersion thermocouple in accordance with claim 6 including a fiberboard tube disposed around the U-shaped tube and secured to the front end of the body.

8. An immersion thermocouple in accordance with claim 6 including a pair of fiberboard protective tubes disposed around the pipe.

9. An immersion thermocouple in accordance with claim 8 in which one of said tubes extends around the foremost portion of said pipe and has an inwardly extending flange at its front end which engages the front ends of the metal sleeve and the graphite sleeve, and the other tube extends around the portion of the pipe behind said one tube with the front end of the other tube overlapping the rear end of the one tube.

10. An immersion thermocouple in accordance with claim 9 including a pair of collars fitting around the pipe, each of said collars having an outwardly extending flange, one of said collars fitting into the rear end of the one tube and the other collar fitting into the rear end of the other tube.

11. An immersion thermocouple in accordance with claim 10 in which the back surface of the flange of each of said collars tapers inwardly.

12. An immersion thermocouple in accordance with claim 11 in which the outer diameter of each of the tubes is slightly greater than the outer diameter of the flange of the collar which fits into the tube.

13. An immersion thermocouple in accordance with claim 12 in which each of said collars has a plurality of setscrews threaded therethrough to secure said collars to said pipe, said setscrews having enlarged heads which frictionally engage the inner surface of said tubes to secure said tubes on said collars.

14. An immersion thermocouple comprising an elongated pipe, a metal sleeve secured to the front end of said pipe, said sleeve having a bore in its front end, a portion of the front end of said sleeve being transversely cut away to provide a pair of shoulders extending from said bore, a graphite sleeve secured around said metal sleeve and projecting beyond the front end of said metal sleeve, said graphite sleeve having a bore therethrough which is in alignment with and larger in diameter than the bore in said metal sleeve, a pair of male contact prongs supported in the bore of said metal sleeve, and a replaceable thermocouple unit including a body member of a diameter equal to the diameter of the bore of said graphite sleeve, a portion of the back end of said body being cut away to provide a rearwardly extending segment which is adapted to fit in the bore of said metal sleeve over the shoulders, a pair of female contacts carried on the back end of said body beneath said segment, said female contacts being adapted to receive said male contact prongs a U-shaped tube having its ends secured to the front end of said body, and a pair of thermocouple wires extending through said body and said tube, one end of each of said wires being connected to a separate one of said female contacts and the other ends of said wires being joined together within said U-shaped tube.

15. An immersion thermocouple in accordance with claim 14 including a fiberboard tube disposed around the U-shaped tube and secured to the front end of the body.

16. An immersion thermocouple in accordance with claim 14 in which the metal sleeve has a square thread on its outer surface and the graphite sleeve has an internal square thread which receives the thread of the metal sleeve.

17. An immersion thermocouple in accordance with claim 14 including a plurality of graphite protective tubes disposed around the pipe in end-to-end engagement.

18. An immersion thermocouple in accordance with claim 17 including a collar secured around the pipe adjacent the back end of said pipe, and a helical spring disposed about said pipe and compressed between said collar and the rearmost graphite tube to hold said tubes against each other and against the back end of the graphite sleeve.

References Cited in the file of this patent
UNITED STATES PATENTS

| | | |
|---|---|---|
| 1,157,026 | Meschenmoser | Oct. 19, 1915 |
| 2,463,427 | Richards | Mar. 1, 1949 |
| 2,556,238 | Tingle | June 12, 1951 |
| 2,584,616 | Richards | Feb. 5, 1952 |
| 2,631,179 | Bell | Mar. 10, 1953 |
| 2,642,468 | Dodson | June 16, 1953 |
| 2,647,153 | Querry | July 28, 1953 |
| 2,672,493 | Tingle et al. | Mar. 16, 1954 |
| 2,706,411 | Bircher | Apr. 19, 1955 |
| 2,785,216 | Winner | Mar. 12, 1957 |
| 2,999,121 | Mead | Sept. 5, 1961 |